(12) United States Patent
Laugier et al.

(10) Patent No.: US 11,282,269 B2
(45) Date of Patent: Mar. 22, 2022

(54) IMAGE-COMPARISON BASED ANALYSIS OF SUBSURFACE REPRESENTATIONS

(71) Applicant: Chevron U.S.A. Inc., San Ramon, CA (US)

(72) Inventors: Fabien J. Laugier, Houston, TX (US); Alicia Downard, Golden, CO (US); Robert Chadwick Holmes, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 122 days.

(21) Appl. No.: 15/929,632

(22) Filed: May 13, 2020

(65) Prior Publication Data

US 2021/0358205 A1    Nov. 18, 2021

(51) Int. Cl.
  *G06T 17/05*    (2011.01)
  *G06T 3/00*    (2006.01)
  *G01N 21/95*    (2006.01)

(52) U.S. Cl.
  CPC .............. *G06T 17/05* (2013.01); *G01N 21/95* (2013.01); *G06T 3/0031* (2013.01)

(58) Field of Classification Search
  None
  See application file for complete search history.

(56) References Cited

U.S. PATENT DOCUMENTS

| | | | |
|---|---|---|---|
| 6,128,577 A | 10/2000 | Assa | |
| 7,672,496 B2* | 3/2010 | Collins | G06K 9/34 |
| | | | 382/128 |
| 2009/0079752 A1* | 3/2009 | Wexler | G06T 15/04 |
| | | | 345/582 |
| 2012/0215513 A1* | 8/2012 | Branets | G01V 99/00 |
| | | | 703/10 |
| 2018/0181693 A1* | 6/2018 | Yang | G06F 30/20 |
| 2021/0011191 A1* | 1/2021 | Harris | G01V 1/282 |

OTHER PUBLICATIONS

PCT Search Report and Written Opinion for Application No. PCT/US21/31817, dated Aug. 10, 2021 (10 pages).

* cited by examiner

*Primary Examiner* — Aaron M Richer

(74) *Attorney, Agent, or Firm* — Esplin & Associates, PC

(57) ABSTRACT

2D slices/images may be extracted from a three-dimensional volume of subsurface data. Image comparison analysis across sequential 2D slices/images may identify boundaries within the corresponding subsurface region, such as changes in style of deposition or reservoir property distribution. Identification of temporal/spatial boundaries in the subsurface region where subsurface properties change may facilitate greater understanding of the scales and controls on heterogeneity, and connectivity between different locations.

16 Claims, 12 Drawing Sheets

IMAGE-COMPARISON BASED ANALYSIS OF SUBSURFACE REPRESENTATIONS

FIELD

The present disclosure relates generally to the field of analyzing subsurface representations using comparison of images.

BACKGROUND

Computer-generated representations of a subsurface region may provide information that captures stratigraphic heterogeneity of a depositional environment. Identifying spatial and/or temporal locations of significant changes within the stratigraphic heterogeneity in computer-generated subsurface representations may be difficult and require consumption of large amounts of resources. Barriers to identifying meaningful shifts in heterogeneity include (1) large volume of data and time/processing power needed to process results in the numerical model and (2) insufficient understanding of how to quantify changes in stratigraphic style.

SUMMARY

This disclosure relates to analyzing subsurface representations. Subsurface representation information and/or other information may be obtained. The subsurface representation information may define a three-dimensional subsurface representation. The three-dimensional subsurface representation may define subsurface configuration of a three-dimensional subsurface region. The three-dimensional subsurface representation may be segmented into layer slices. Two-dimensional map images of the layer slices may be generated based on the subsurface configuration of the layer slices and/or other information. One or more boundaries within the three-dimensional subsurface representation may be identified based on comparison of adjacent ones of the two-dimensional map images and/or other information.

A system that analyzes subsurface representations may include one or more electronic storage, one or more processors and/or other components. The electronic storage may store subsurface representation information, information relating to three-dimensional subsurface representation, information relating to subsurface configuration, information relating to layer slices, information relating to two-dimensional map images, information relating to boundaries within three-dimensional subsurface representation, and/or other information.

The processor(s) may be configured by machine-readable instructions. Executing the machine-readable instructions may cause the processor(s) to facilitate analyzing subsurface representations. The machine-readable instructions may include one or more computer program components. The computer program components may include one or more of a subsurface representation component, a segment component, a map component, a boundary component, and/or other computer program components.

The subsurface representation component may be configured to obtain subsurface representation information and/or other information. The subsurface representation information may define a three-dimensional subsurface representation. The three-dimensional subsurface representation may define subsurface configuration of a three-dimensional subsurface region. In some implementations, the subsurface configuration may be defined by values of one or more subsurface properties as a function of position within the three-dimensional subsurface region.

In some implementations, the three-dimensional subsurface representation may be defined as a three-dimensional array of cells. Cell values of the three-dimensional array of cells may define corresponding subsurface configuration.

The segment component may be configured to segment the three-dimensional subsurface representation into layer slices. In some implementations, the layer slices may include groupings of the three-dimensional array of cells that define the three-dimensional subsurface representation. In some implementations, the three-dimensional subsurface representation may be segmented into the layer slices based on depositional processes used to generate the three-dimensional subsurface representation and/or other information.

The map component may be configured to generate two-dimensional map images of the layer slices based on the subsurface configuration of the layer slices and/or other information. In some implementations, the subsurface configuration may be defined by values of multiple subsurface properties as a function of position within the three-dimensional subsurface region. Separate sets of two-dimensional map images may be generated for separate subsurface properties.

The boundary component may be configured to identify one or more boundaries within the three-dimensional subsurface representation based on comparison of adjacent ones of the two-dimensional map images and/or other information. In some implementations, identification of the boundar(ies) within the three-dimensional subsurface representation based on the comparison of the adjacent ones of the two-dimensional map images may include: determination of similarity scores between adjacent layer slices based on the comparison of the adjacent ones of the two-dimensional map images and/or other information; generation of a similarity plot based on the similarity scores and/or other information; and identification of the boundar(ies) within the three-dimensional subsurface representation based on the similarity plot and/or other information.

In some implementations, the subsurface configuration may be defined by values of multiple subsurface properties as a function of position within the three-dimensional subsurface region. Separate sets of similarity scores may be determined for separate subsurface properties. Separate similarity plots may be generated for separate subsurface properties. In some implementations, the comparison of the adjacent ones of the two-dimensional map images may include comparison of adjacent images within individual sets of two-dimensional map images.

In some implementations, two or more of the separate similarity plots may be combined for the identification of the boundar(ies) within the three-dimensional subsurface representation.

In some implementations, addition and/or removal of one or more features in the subsurface configuration of the three-dimensional subsurface region may be determined based on the comparison of the adjacent ones of the two-dimensional map images and/or other information.

In some implementations, the identification of the boundar(ies) within the three-dimensional subsurface representation may be used to segment other three-dimensional subsurface regions. In some implementations, the identification of the boundar(ies) within the three-dimensional subsurface representation may be used to determine correlation between well segments.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to analyzing subsurface representations. 2D slices/images may be extracted from a three-dimensional volume of subsurface data. Image comparison analysis across sequential 2D slices/images may identify boundaries within the corresponding subsurface region, such as changes in style of deposition or reservoir property distribution. Identification of temporal/spatial boundaries in the subsurface region where subsurface properties change may facilitate greater understanding of the scales and controls on heterogeneity, reservoir property distributions, and connectivity between different locations.

Figure 1:
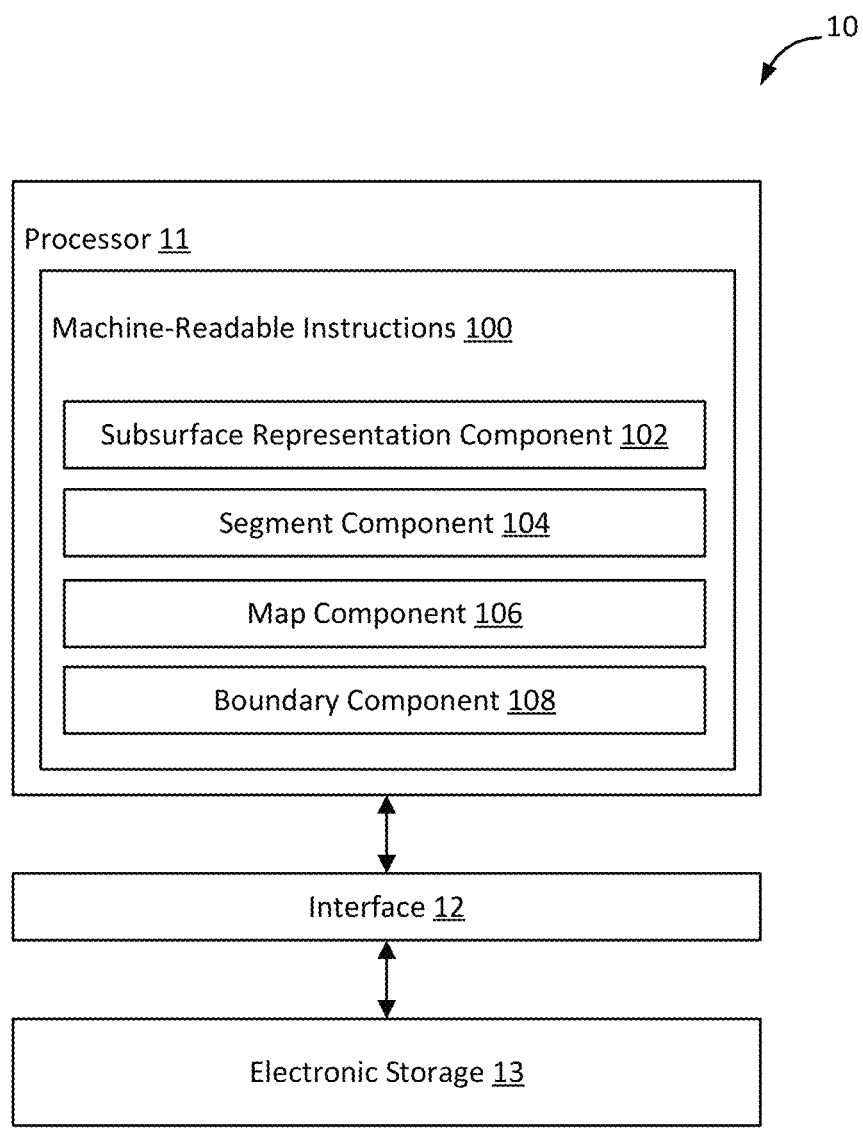
FIG. 1 illustrates an example system that analyzes subsurface representations.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Subsurface representation information and/or other information may be obtained by the processor 11. The subsurface representation information may define a three-dimensional subsurface representation. The three-dimensional subsurface representation may define subsurface configuration of a three-dimensional subsurface region. The three-dimensional subsurface representation may be segmented by the processor 11 into layer slices. Two-dimensional map images of the layer slices may be generated by the processor 11 based on the subsurface configuration of the layer slices and/or other information. One or more boundaries within the three-dimensional subsurface representation may be identified by the processor 11 based on comparison of adjacent ones of the two-dimensional map images and/or other information.

Accurate predictions of reservoir connectivity may require a thorough understanding of reservoir heterogeneity and how it and reservoir properties vary spatially (e.g., laterally, vertically) within a reservoir. In order to acquire the necessary information to make these types of predictions in real assets, significant investment may be needed to acquire dense well data-sets and/or seismic data-sets. Acquiring dense well data may be prohibited by costs and/or facilities, while seismic data may not have sufficient resolution to identify critical heterogeneity boundary information. As a result, numerical models/computer-generated representations of the subsurface may be used to develop predictive models of subsurface heterogeneity, such as spatial variations in reservoir properties, which may be used to guide decisions such as where to drill wells.

Computer-generated representations of subsurface regions may provide information that capture stratigraphic heterogeneity of a depositional environment. For example, numerical models of stratigraphy may provide a data-set of spatial, lateral, and vertical (e.g., depth and/or temporal) properties within constructed environments of deposition (EODs) that effectively capture the stratigraphic heterogeneity. Understanding the spatial and temporal changes in heterogeneity and key boundaries, is key to developing predictive frameworks that drive critical business challenges such where to drill wells and what development well patterns to use.

To leverage computer-generated representations of subsurface regions in understanding where significant changes in heterogeneity are occurring within EODs, it may be necessary to identify where spatial and/or temporal locations of significant changes of the stratigraphic heterogeneity occur within the representations. For example, such heterogeneities may include changes in spatial location of sand-rich deposition through time or where and when the style of deposition (and the associated rock properties that would impact reservoir properties) changes. The evaluation of whether common spatial and temporal patterns of heterogeneity are present and predictive across multiple instances of computer-generated EODs may be used to identify the same types of boundaries and predictions in subsurface regions of associated reservoirs (i.e., hydrocarbon reservoirs that are of a similar EOD to those computer generated subsurface representations/numerical models). Identifying spatial and/or temporal locations of significant changes within the stratigraphic heterogeneity may be difficult and require consumption of a large amount of resources. Barriers to identifying meaningful shifts in heterogeneity include (1) large volume of data and time/processing power needed to process results in the numerical model (e.g., subsurface data volume, such as seismic or different types of numerical models and/or maps made from well data) and (2) insufficient understanding on how to quantify changes in stratigraphic style.

Image-based segmentation of a subsurface region may be used to identity where spatial and/or temporal locations of significant changes of stratigraphic heterogeneity occur within computer-generated representations of subsurface regions. For example, image comparison analyses across sequential 2D slices/images (in a single or multiple directions) extracted from a three-dimensional volume of subsurface data (i.e., numerical model, subsurface representation, sequence of maps, geophysical volume) may be used to identify locations of changes in style of deposition and/or reservoir property distribution. Such changes may be evidenced by changes in image dissimilarity/similarity. Such process may enable identification of the time/depth boundaries/locations in a subsurface volume where the spatial (vertical or horizontal) geologic character changes, resulting in a more thorough understanding of the scales and controls on heterogeneity, and therefore connectivity, in a depositional model.

By processing numerical models and multiple instances of individual environment of deposition, it is possible to identify whether or not common scales and locations of heterogeneity boundaries exist first within multiple instances of numerical models of EODs, then in multiple instances of real/reservoir EODs. This impacts the direct application of numerical model analysis to improving subsurface reservoir characterization. For example, the identified boundaries may be used to assess which patterns in well logs are important for predicting those important heterogeneity boundaries. Such analysis also makes it possible to identify key boundaries to incorporate into reservoir models of subsurface regions, which may be used to forecast connectivity estimations and determine development well locations. For example, such information may be used to improve understanding of the spatial distribution of reservoir properties in actual subsurface assets and/or in determining where to drill wells.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store subsurface representation information, information relating to three-dimensional subsurface representation, information relating to subsurface configuration, information relating to layer slices, information relating to two-dimensional map images, information relating to boundaries within three-dimensional subsurface representation, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate analyzing subsurface representations. The machine-readable instructions 100 may include one or more computer program components. The machine-readable instructions 100 may include one or more of a subsurface representation component 102, a segment component 104, a map component 106, a boundary component 108, and/or other computer program components.

The subsurface representation component 102 may be configured to obtain subsurface representation information and/or other information. Obtaining subsurface representation information may include one or more of accessing, acquiring, analyzing, creating, determining, examining, generating, identifying, loading, locating, opening, receiving, retrieving, reviewing, selecting, storing, utilizing, and/or otherwise obtaining the subsurface representation information. The subsurface representation component 102 may obtain subsurface representation information from one or more locations. For example, the subsurface representation component 102 may obtain subsurface representation information from a storage location, such as the electronic storage 13, electronic storage of a device accessible via a network, and/or other locations. The subsurface representation component 102 may obtain subsurface representation information from one or more hardware components (e.g., a computing device, a component of a computing device) and/or one or more software components (e.g., software running on a computing device). Subsurface representation information may be stored within a single file or multiple files.

The subsurface representation information may define a three-dimensional subsurface representation. The subsurface representation information may define a three-dimensional subsurface representation by including information that describes, delineates, identifies, is associated with, quantifies, reflects, sets forth, and/or otherwise defines one or more of content, quality, attribute, feature, and/or other aspects of the three-dimensional subsurface representation. For example, the subsurface representation information may define a three-dimensional subsurface representation by including information that makes up the content of the three-dimensional subsurface representation and/or information that is used to identify/determine the content of the three-dimensional subsurface representation. Other types of subsurface representation information are contemplated.

A three-dimensional subsurface representation may refer to a three-dimensional computer-generated representation of a subsurface region, such as a three-dimensional model of the subsurface region. A three-dimensional subsurface representation may be representative of the subsurface volume sampled by one or more well. A three-dimensional subsurface representation may include geologically plausible arrangement of rock obtained from a modeling process (e.g., stratigraphic forward modeling process). A three-dimensional subsurface representation may include a group of pseudo wells extracted from that subsurface representation. A three dimensional subsurface representation may include a group of wells extracted from a subsurface region whose environment of deposition is similar to the EOD of the computer-generated three-dimensional subsurface representation. A three-dimensional subsurface representation may include/be a seismic volume. A three-dimensional subsurface representation may provide subsurface configuration at different locations within a three-dimensional subsurface region (e.g., provide simulated well log values at locations in a three-dimensional (x-y-z) coordinate system).

A subsurface region may refer to a part of earth located beneath the surface/located underground. A subsurface region may refer to a part of earth that is not exposed at the surface of the ground. A subsurface region may be defined in a single dimension or in multiple dimensions. For example, a three-dimensional subsurface region may be defined in three-dimensions, and may define a volume of earth.

A three-dimensional subsurface representation may define subsurface configuration of a three-dimensional subsurface region. Subsurface configuration may refer to attribute, quality, and/or characteristics of a subsurface region. Subsurface configuration may refer to physical arrangement of materials (e.g., subsurface elements) within a subsurface region. Examples of subsurface configuration may include types of subsurface materials, characteristics of subsurface materials, compositions of subsurface materials, arrangements/configurations of subsurface materials, physics of subsurface materials, and/or other subsurface configuration. For instance, subsurface configuration may include and/or define types, shapes, and/or properties of materials and/or layers that form subsurface (e.g., geological, petrophysical, geophysical, stratigraphic) structures.

In some implementations, the subsurface configuration may be defined by values of one or more subsurface properties as a function of position within the three-dimensional subsurface region. A subsurface property may refer to a particular attribute, quality, and/or characteristics of a subsurface region. For instance, the subsurface configuration of a subsurface region may be defined by values of multiple subsurface properties at different spatial positions within the subsurface region. For example, the subsurface configuration of a subsurface region may be defined by values of sand thickness, sand quality, sand volume, and/or other sand characteristics at different spatial positions within the subsurface region. Other subsurface properties are contemplated.

In some implementations, the three-dimensional subsurface representation may be defined as a three-dimensional array of cells. For example, the three-dimensional subsurface representation may include a three-dimensional numerical geocelluar model. Different cells within the array may correspond to different locations (spatial locations, temporal locations) within the three-dimensional subsurface representation/subsurface region. A cell may be used to convey information relating to the subsurface configuration of the three-dimensional subsurface representation/subsurface region at the corresponding location. Cell values of the three-dimensional array of cells may define corresponding subsurface configuration of the three-dimensional subsurface representation/subsurface region at the corresponding location. For example, the three-dimensional array of cells may contain cell-by-cell (voxel) data on subsurface properties (e.g., geological, petrophysical, geophysical, and/or stratigraphic properties, such as grain size, grain type, grain lithology, porosity, permeability, deposit thickness, mineralogy) of the subsurface representation/subsurface region.

A three-dimensional subsurface representation may be generated by and/or through one or more subsurface models. A subsurface model may refer to a computer model (e.g., program, tool, script, function, process, algorithm) that generates subsurface representations. A subsurface model may simulate subsurface configuration within a region underneath the surface (subsurface region).

An example of a subsurface model is a computational stratigraphy model. A computational stratigraphy model may refer to a computer model that simulates depositional and/or stratigraphic processes on a grain size scale while honoring physics-based flow dynamics. A computational stratigraphy model may simulate rock properties, such as velocity and density, based on rock-physics equations and assumptions. Input to a computational stratigraphy model may include information relating to a subsurface region to be simulated. For example, input to a computational stratigraphy model may include paleo basin floor topography, paleo flow and sediment inputs to the basin, and/or other information relating to the basin. In some implementations, input to a computational stratigraphy model may include one or more paleo geologic controls, such as climate changes, sea level changes, tectonics and other allocyclic controls. Output of a computational stratigraphy model may include one or more subsurface representations. A subsurface representation generated by a computational stratigraphy model may be referred to as a computational stratigraphy model representation.

A subsurface model may include a forward stratigraphic model. A forward stratigraphic model may be an event-based model, a process mimicking model, a reduced physics-based model, and/or a fully physics based model (e.g., fully based on physics of flow and sediment transport). A forward stratigraphic model may simulate one or more sedimentary processes that recreate the way stratigraphic successions develop and/or are preserved. The forward stratigraphic model may be used to numerically reproduce the physical processes that eroded, transported, deposited and/or modified the sediments over variable time periods. In a forward modelling approach, data may not be used as the anchor points for facies interpolation or extrapolation. Rather, data may be used to test and validate the results of the simulation. Stratigraphic forward modelling may be an iterative approach, where input parameters have to be modified until the results are validated by actual data. Usage of other subsurface models and other subsurface representations are contemplated.

Figure 3:
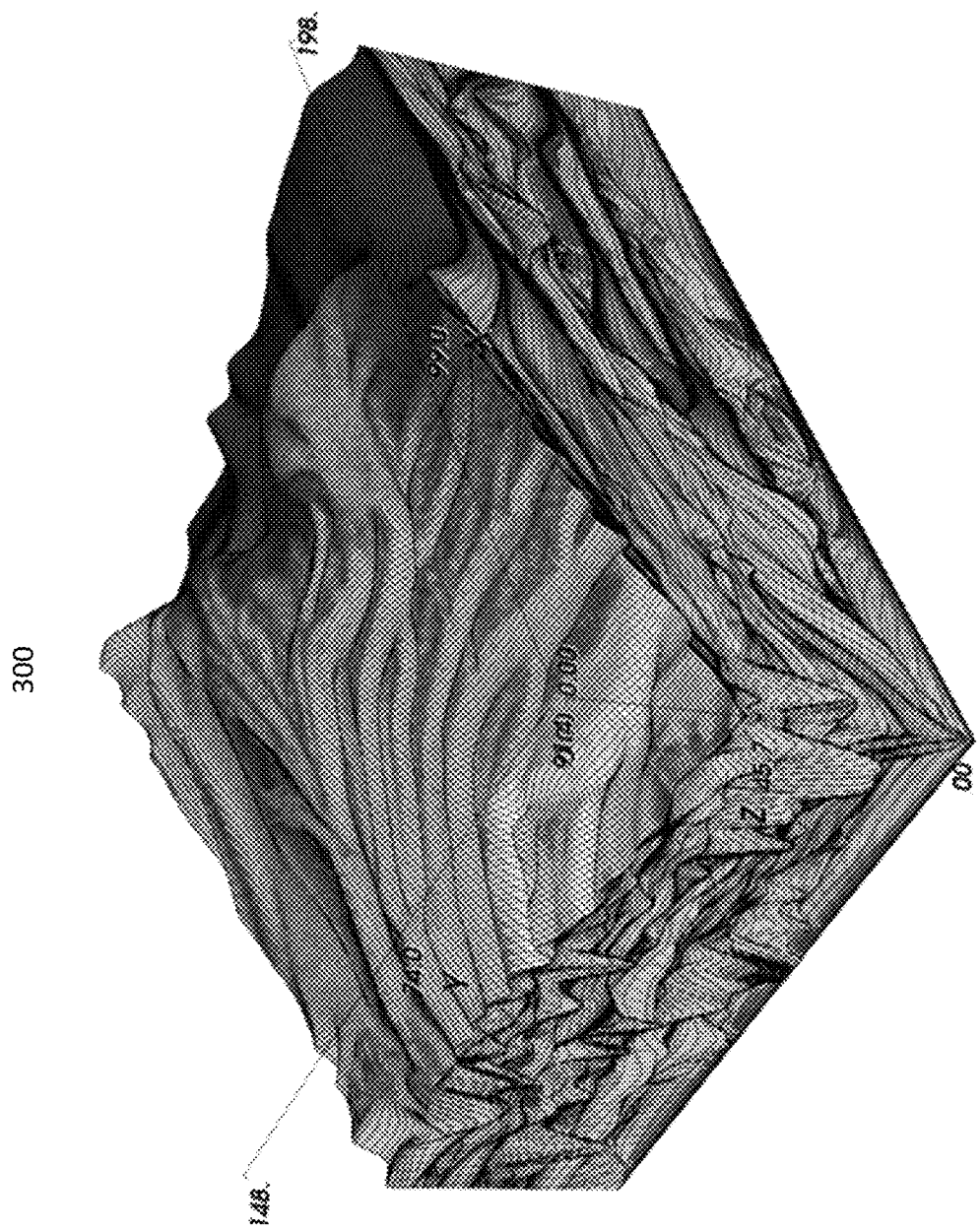
FIG. 3 illustrates an example subsurface representation.

FIG. 3 illustrates an example subsurface representation 300. The subsurface representation 300 may define subsurface configuration of a three-dimensional subsurface region. The subsurface configuration may be defined within the subsurface representation 300 as a function of spatial location, such as a function of vertical spatial location (e.g., depth), lateral spatial location (e.g., x-y coordinate in map view), and/or other spatial location. The subsurface configuration may be defined within the subsurface representation 300 as a function of temporal location (e.g., time of deposition). For example, the subsurface representation 300 may define different types, shapes, and/or properties of materials and/or layers as a function of depth into the ground and as a function of lateral spatial location. The subsurface representation 300 may define different types, shapes, and/or properties of materials and/or layers as a function of time at which the materials were deposited. The subsurface configuration defined within the subsurface representation 300 may simulate the subsurface configuration that would be seen within a volume (e.g., well, reservoir) in the ground.

In some implementations, a subsurface representation may be representative of a subsurface region of interest. For example, the subsurface configuration defined by a subsurface representation may be representative of the subsurface configuration of a reservoir of interest and/or representative of an environment of deposition of interest. Other subsurface regions of interest are contemplated. In some implementations, a subsurface representation may be scaled in area size and thickness to match a subsurface region of interest. For example, lateral size and/or vertical depth of a subsurface representation may be changed to be comparable to the size and thickness of a subsurface region of interest.

The segment component 104 may be configured to segment the three-dimensional subsurface representation into layer slices. Segmenting the three-dimensional subsurface representation may include dividing, separating, and/or separating the three-dimensional subsurface representation into layer slices. A layer slice may include/represent a portion of the three-dimensional subsurface representation. For example, the three-dimensional subsurface representation (three-dimensional numerical geocelluar model) may be defined as a three-dimensional array of cells, and the layer slices may include groupings of the three-dimensional array of cells that define the three-dimensional subsurface representation. The layer slices may include groupings of cells within the three-dimensional numerical geocelluar model. A grouping of cells may include one or more cells.

A layer slice may extend across the entirety of the three-dimensional subsurface representation (e.g., extend laterally across the entire three-dimensional subsurface representation) or through a portion of the three-dimensional subsurface representation (e.g., extend laterally across a corner of the three-dimensional subsurface representation). For example, a layer slice may include different vertical and/or lateral dimensions at different spatial locations within the three-dimensional subsurface representation. For instance, a layer slice may not have a uniform/same thickness/width, but may have varying thickness/width throughout the three-dimensional subsurface representation. The layer slices may include variable orientations and/or combinations of different vertical and lateral dimensions. For example, a layer slice may include a flat cross-section of the three-dimensional subsurface representation or a curved cross-section of the three-dimensional subsurface representation.

In some implementations, the three-dimensional subsurface representation may be segmented into the layer slices based on depositional processes used to generate the three-dimensional subsurface representation and/or other information. The depositional processes used to generate the three-dimensional subsurface representation may include depositional processes used by subsurface model(s) to generate the three-dimensional subsurface representation, such as layer-by-layer building of the three-dimensional subsurface representation based on deposition times by a subsurface model. The deposition processes used to generate the three-dimensional subsurface representation may include techniques, algorithms, and/or parameters of the subsurface model(s), such as time of flow events and/or cell-resolution, deposition time steps, and/or information about depositional processes simulated by the subsurface model(s), such as information relating to hydrograph and average thickness of different types of features, which are related to groups of cells.

The three-dimensional subsurface representation may be separated so that individual layer slices include coherent packages of data (through time, depth, and/or space). Coherent packages may include time-coherent packages (e.g., packages of rock deposited at the same deposition duration), and/or other coherent packages. For example, the three-dimensional subsurface representation may be segmented into layer slices, with individual layer slices including the portion of the three-dimensional subsurface representation deposited at the same deposition duration and/or during the same flow event(s).

Figure 4A:
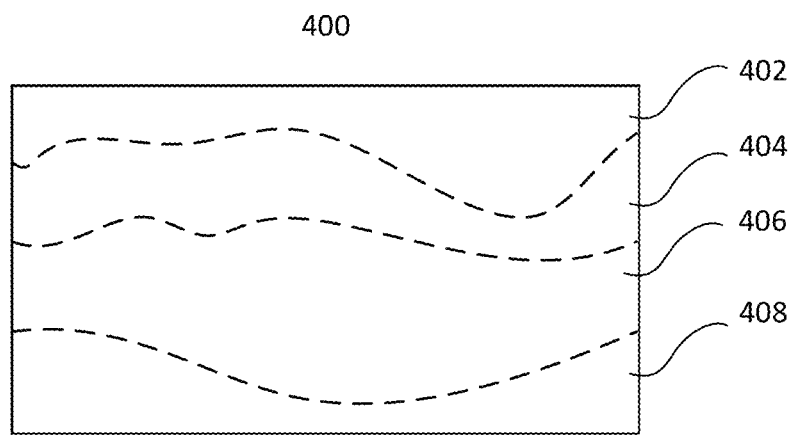
FIG. 4A illustrates example layers within a subsurface representation.

FIG. 4A illustrates example a subsurface representation 400. The subsurface representation 400 may include layers 402, 404, 406, 408. The layers 402, 404, 406, 408 may include layers of sediments (e.g., rock) deposited at different times. The vertical dimension of the subsurface representation 400 may be depth. The use of depth for vertical dimension of the subsurface representation 400 is merely as an example and is not meant to be limiting. Other properties may be used as the vertical dimension of subsurface representation.

Figure 4B:
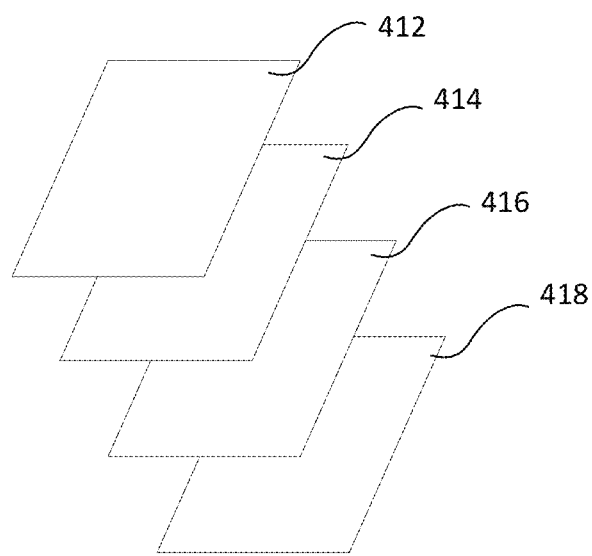
FIG. 4B illustrates example layer slices of the layers shown in FIG. 4A.

FIG. 4B illustrates example layer slices 412, 414, 416, 418 of the layers 402, 404, 406, 408 shown in FIG. 4A. In FIG. 4A, the subsurface representation 400 may be segmented into the layer 402, 404, 406, 408 of non-uniform thickness. In FIG. 4B, different portions of the subsurface representation 400 may be represented as individual layer slices 412, 414, 416, 418, with individual layer slices corresponding to/including a layer of the subsurface representation 400. The layer slice 412 may correspond to/include the layer 402. The layer slice 414 may correspond to/include the layer 404. The layer slice 416 may correspond to/include the layer 406. The layer slice 418 may correspond to/include the layer 408. Different layer slices 412, 414, 414, 416 may represent layers of different thicknesses as a function of lateral spatial position. The thickness of the layers corresponding to/included within a layer slice may depend on the depositional processes used by the subsurface model to simulate layer deposition.

The map component 106 may be configured to generate two-dimensional map images of the layer slices based on the subsurface configuration of the layer slices and/or other information. A two-dimensional map image may refer to a two-dimensional image that provides visual representation of the subsurface configuration of a corresponding layer slice. A two-dimensional map image may provide visual representation of the subsurface configuration of a corresponding layer slice using one or more of pixel value, pixel color, pixel intensity, and/or other pixel characteristics. The characteristic(s) of a pixel of the two-dimensional map image may represent (e.g., reflect) the subsurface configuration of the corresponding layer slice at the corresponding position (e.g., lateral position). For example, value, color, and/or intensity of a pixel of the two-dimensional map image may represent the grain size, grain type, grain lithology, porosity, permeability, deposit thickness, and/or mineralogy of the layer slice at the corresponding position.

While the disclosure herein is described with respect to conversion of three-dimensional data into a series of two-dimensional map images (representing 3D data as a series of maps or oriented cross-section), the techniques described herein may be applied to data sets that already exists in the form of map series and/or to other dimensional data. For example, the techniques described herein may be applied to depth or time-based contour maps, which may be generated based on one-dimensional data, such as vertical/horizontal well data, or two-dimensional seismic data.

In some implementations, generation of a two-dimensional map image of a layer slice based on the subsurface configuration of the layer slice may include conversion of the subsurface configuration of the layer slice (value(s) of subsurface propert(ies)) into pixel form. For example, summary properties (e.g., thickness, sand proportion) may be calculated over coherent package intervals, and numerical information from the summary properties may be transformed into two-dimensional map images. The numerical information may be transformed into two-dimensional map images of individual calculated property for each sequential package of data.

In some implementations, the subsurface configuration may be defined by values of multiple subsurface properties as a function of position within the three-dimensional subsurface region. The subsurface configuration for a particular position within the three-dimensional subsurface region may be defined by values of separate/different subsurface properties. Separate sets of two-dimensional map images may be generated for separate subsurface properties. For example, for a single layer slice, a two-dimensional map image may be generated to provide visual representation of layer thickness and a separate two-dimensional map image may be generated to provide visual representation of grain size. In some implementations, multiple subsurface properties may be used to generate two-dimensional map images. For example, a two-dimensional map image may be generated to provide visual representation of thickness and permeability. In some implementations, two-dimensional map images may be generated based on combination of other two-dimensional map images. For example, a set of two dimensional map images may be generated to provide visual representation of thickness (thickness map images) and another set of two dimensional map images may be generated to provide visual representation of permeability (permeability map images). The two sets of two-dimensional map images visually representing different properties may be combined to generate a set of two-dimensional map images that provide visual representation of thickness and permeability (thickness and permeability map images). Other two-dimensional map images for other subsurface properties are contemplated.

Figure 5:
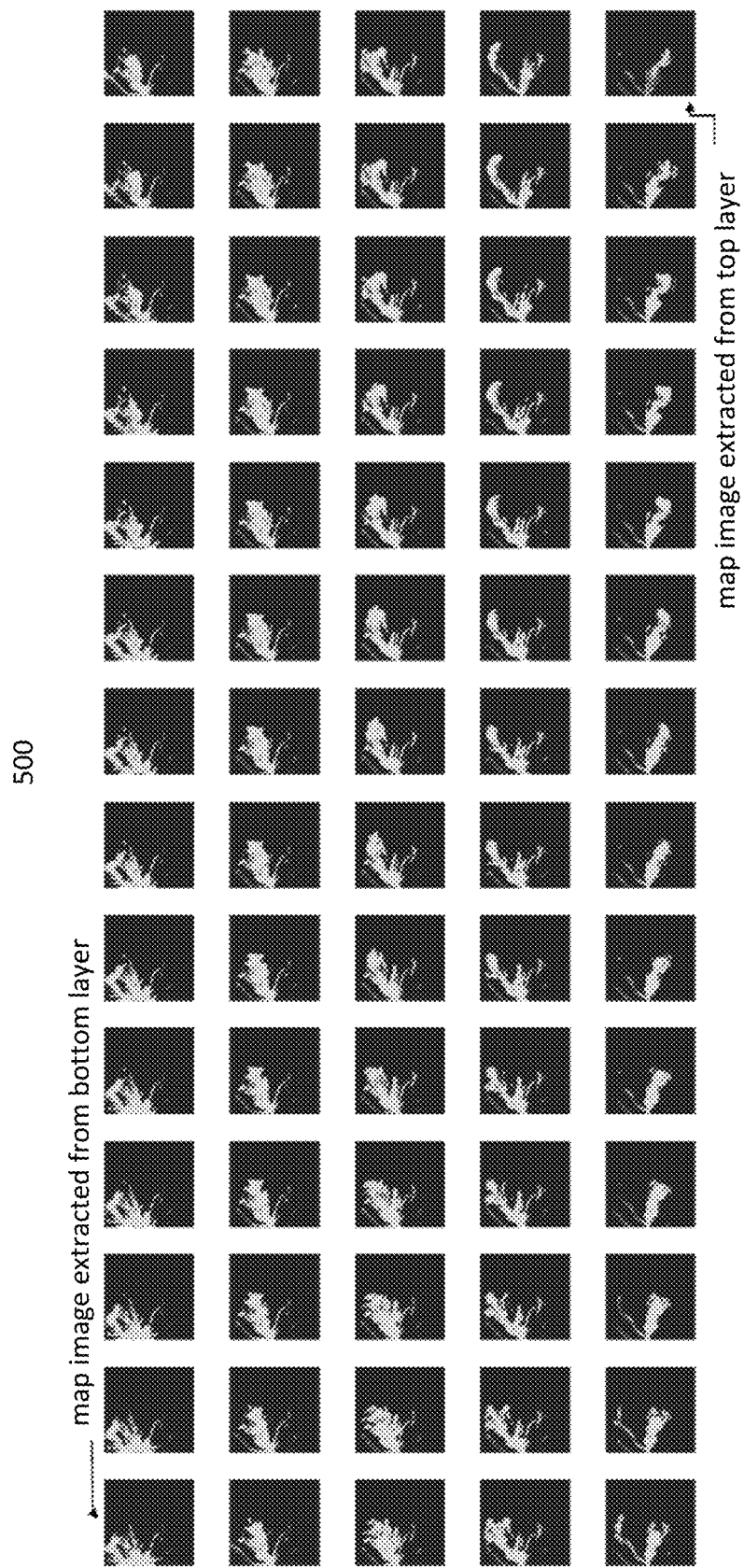
FIG. 5 illustrates example map images of layer slices.

FIG. 5 illustrates example map images 500 of layer slices. The map images 500 may visually represent the subsurface configuration of different layer slices. The pixel characteristics of the map images 500 may represent one or more subsurface properties at corresponding positions within a three-dimensional subsurface representation. For example, in FIG. 5, the map images 500 may represent the subsurface configuration of a three-dimensional subsurface representation that has been segmented into 70 individual layers. Subsurface data may be extracted for individual layers, and data from individual layers may be contoured and/or represented within individual map images 500. For instance, in FIG. 5, one of the map images 500 may represent subsurface data of the bottom layer of the three-dimensional subsurface representation, and another of the map images 500 may represent subsurface data of the top layer of the three-dimensional subsurface representation. The map images between these two map images may represent subsurface data of layers between the bottom layer and the top layer of the three-dimensional subsurface representation. Such representation of the subsurface configuration within the map images 500 may enable analysis of the subsurface configuration of the three-dimensional subsurface representation through image analysis.

The boundary component 108 may be configured to identify one or more boundaries within the three-dimensional subsurface representation based on comparison of adjacent ones of the two-dimensional map images and/or other information. A boundary within a three-dimensional subsurface representation may include a spatial boundary and/or a temporal boundary. A boundary within a three-dimensional subsurface representation may divide the three-dimensional subsurface representation into different parts. A boundary within a three-dimensional subsurface representation may mark the edge or the limit of a part within the three-dimensional subsurface representation. A boundary within a three-dimensional subsurface representation may refer to a boundary between one or more changes in the subsurface configuration of the three-dimensional subsurface representation. For example, a boundary may mark the surface between parts of the three-dimensional subsurface representation with significant changes (e.g., difference larger than a threshold value) in deposition and/or heterogeneity (in space and/or time), or property value. A boundary within the three-dimensional subsurface representation may correspond to a boundary within the three-dimensional subsurface region represented by the three-dimensional subsurface representation.

A boundary within the three-dimensional subsurface representation may be defined within two or more dimensions. For example, a boundary within the three-dimensional subsurface representation may be as a two-dimensional surface that separates different parts of the three-dimensional subsurface representation. A boundary within the three-dimensional subsurface representation may extend across the entirety of the three-dimensional subsurface representation (e.g., extend laterally across the entire three-dimensional subsurface representation) or through a portion of the three-dimensional subsurface representation (e.g., extend laterally across a corner of the three-dimensional subsurface representation).

Identification of boundar(ies) within the three-dimensional subsurface representation based on comparison of adjacent ones of the two-dimensional map images may include use of image comparison analysis to identify the boundar(ies). Comparison of adjacent two-dimensional map images may effectuate comparison of the subsurface configuration of adjacent (e.g., sequential) layer slices within the three-dimensional subsurface representation.

Image comparison analysis may refer to analysis that compares one or more visual characteristics of multiple two-dimensional map images. For example, image comparison analysis may include comparison of the presence, values, colors and/or intensities of pixels within different two-dimensional map images. Image comparison analysis may perform comparison of visual characteristics individually (e.g., compare a pixel within one two-dimensional map image to a pixel within another two-dimensional map image) and/or in groups (e.g., compare a group of pixels within one two-dimensional map image to a group of pixels within another two-dimensional map image). Image comparison analysis may perform comparison of visual characteristics of all pixels within different two-dimensional map images.

Pixels that are compared in the image comparison analysis may include pixels that correspond to spatially adjacent locations within the three-dimensional subsurface representation. For example, pixels that are compared in the image comparison analysis may include pixels that correspond to vertically adjacent points/areas of the three-dimensional subsurface representation (same X and Y location but a different Z/depth/time location). The image comparison analysis may be used to determine how and/or to what extent the subsurface characteristics changes across different/adjacent/sequential layer slices.

For example, one or more image comparison analysis, such as mean squared error and/or structural similarity index, may be used to quantitatively compare sequential map images. Adjacent/sequential map images may be compared as pairs of images, and the comparison may be stored as one or more value (e.g., values of comparison metric).

Figure 6:
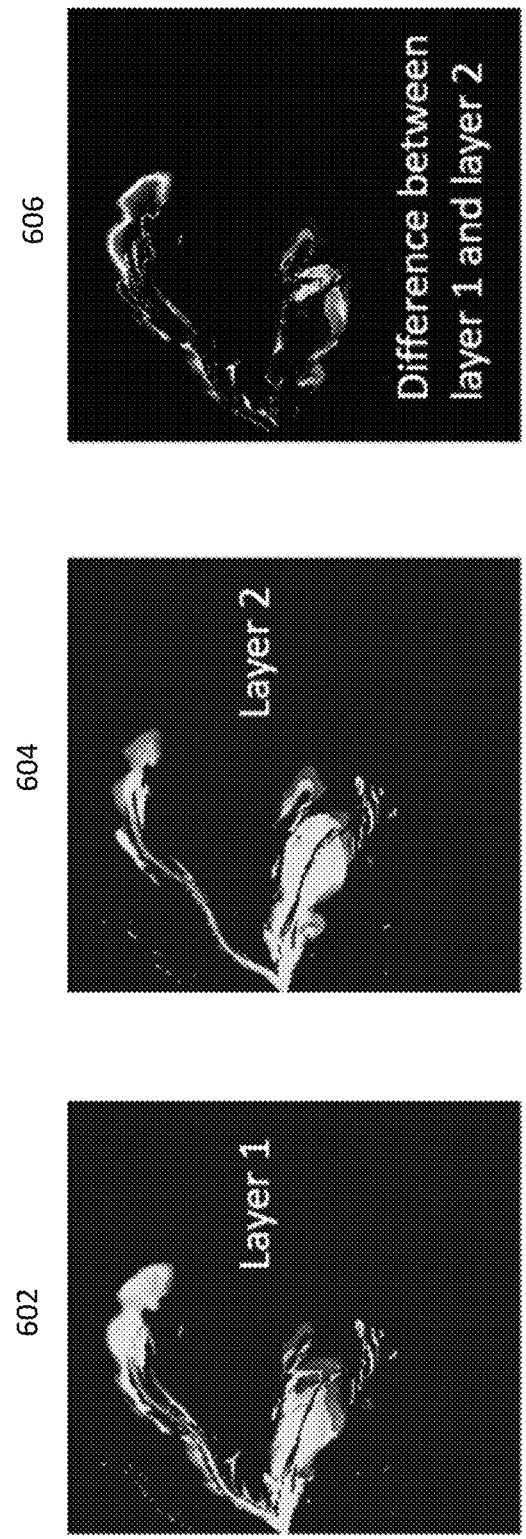
FIG. 6 illustrates example differences between two map images.

FIG. 6 illustrates example differences between two map images 602, 604. The map images 602, 604 may include visual representation of the subsurface configuration of two layer slices. The layer slices may include adjacent/sequential layer slices of a three-dimensional subsurface representation. For example, the map image 602 may visually represent the subsurface configuration layer 1 of the three-dimensional subsurface representation and the map image 604 may visually represent the subsurface configuration layer 2. Layers 1 and 2 may be adjacent/sequential layers (e.g., layer 1 preceding/following layer 2, layer 2 preceding/following layer 1). One or more image comparison analysis may be used to determine the difference between the layers, such as based on presence of pixels and/or change in value/intensity of pixels. The difference between the layers may be represented in visual form, such as in a difference map image 606.

In some implementations, addition and/or removal of one or more features in the subsurface configuration of the three-dimensional subsurface region may be determined based on the comparison of the adjacent ones of the two-dimensional map images and/or other information. That is, adjacent/sequential two-dimensional map images may be compared in pairs to determine when particular feature(s) in the subsurface configuration of the three-dimensional subsurface region appears and/or disappears. Addition and/or removal of a feature may include a change in a feature's spatial and/or temporal position, and/or a change in a feature's characteristics (e.g., as evidenced by changes in pixel characteristic(s)). The adjacent/sequential two-dimensional map images may be compared in pairs to determine when values of particular subsurface features (e.g. pixel values representing density) increase or decrease, and such change in values of particular subsurface features between pairs of map-images may be used to determine when a feature appears/disappears within the map images. The appearance/disappearance of the feature may reflect addition (e.g., new deposition)/removal (e.g., erosion) of particular subsurface features.

For instance, comparison of such pairs of map-images may be used to determine which portions of the three-dimensional subsurface region include areas of increased sand deposition and which portions of the three-dimensional subsurface region include areas of retreating/shutting down deposition. Such determination of changes in subsurface features may be used to determine the temporal and/or spatial evolution of subsurface features, such as the erosion of a subsurface body or the deposition of a fan lobe. For example, a feature (such as a lobe or a channel) may still be present, but may have shifted in space and/or the quality of the feature may change through space and/or time (e.g., change in location of the feature and/or change in the feature's characteristics, such as dimensions or properties represented by pixel intensity/value). For instance, a channel may be located in the same spatial position (same lateral and vertical position) but its dimensions and/or rock properties may have changed, and the changes in dimensions and/or rock properties may be indicated by changes in pixel intensity/value across pairs of map-images.

For instances in which separate sets of two-dimensional map images are generated for separate subsurface properties (e.g., different sets of two-dimensional map images generated using different properties for the same subsurface region), comparison of adjacent/sequential two-dimensional map images may include comparison of adjacent/sequential two-dimensional map images within individual sets of two-dimensional map images. That is, adjacent/sequential map images that visually represent the same subsurface properties may be compared in pairs. For example, the subsurface configuration of a subsurface region may be defined by values of multiple subsurface properties, such as sand thickness, sand quality, sand volume, and/or other sand characteristics, at different spatial positions within the subsurface region. Separate sets of two-dimensional map images may be generated for sand thickness, sand quality, sand volume, and/or other sand characteristics. Adjacent/sequential two-dimensional map images visually representing the sand thickness may be compared in pairs, adjacent/sequential two-dimensional map images visually representing the sand quality may be compared in pairs, adjacent/sequential two-dimensional map images visually representing the sand volume may be compared in pairs, and adjacent/sequential two-dimensional map images visually representing other sand characteristics may be compared in pairs.

In some implementations, identification of the boundar(ies) within the three-dimensional subsurface representation based on the comparison of the adjacent ones of the two-dimensional map images may include: determination of similarity scores between adjacent layer slices based on the comparison of the adjacent ones of the two-dimensional map images and/or other information; generation of a similarity plot based on the similarity scores and/or other information; and identification of the boundar(ies) within the three-dimensional subsurface representation based on the similarity plot and/or other information. One or more similarity plots may be used to identify spatial and/or temporal boundaries within the three-dimensional subsurface representation.

A similarity score may refer to one or more values (e.g., number, percentage) that reflects similarity between the compared two-dimensional map images. A similarity score may reflect total (e.g., average) similarity between the entirety of compared two-dimensional map-images and/or may reflect separate similarity between different parts of the compared two-dimensional map-images. A similarity score may include a general similarity score, a mathematic similarity score, and/or other similarity score. For example, a similarity score for a pair of compared two-dimensional map-images may be determined based on an error calculation that captures similarity/dissimilarity of different layer slices. In some implementations, a dissimilarity score (reflecting dissimilarity/difference between two-dimensional map images) may be used in place of and/or in addition to the similarity score.

A similarity plot may refer to a graphical representation (e.g., graph, curve) of the similarity score. A similarity plot may show the values of the similarity score in a sequential series (e.g., time series, space series). Identification of boundar(ies) within the three-dimensional subsurface representation based on the similarity plot may include use of the similarity scores in the sequence to identify spatial/temporal locations of significant changes in style of deposition and/or heterogeneity. For example, rapid/sharp changes in a similarity plot may indicate spatial/temporal locations of significant changes in boundar(ies) within the three-dimensional subsurface representation. For instance, certain value thresholds and/or certain increases/decreases in values (e.g., high values in the gradient of the similarity score) may highlight the presence or disappearance of a boundary. As another example, certain patterns within a similarity plot may indicate boundar(ies) within the three-dimensional subsurface representation. In some implementations, a dissimilarity plot (a graphical representation of the dissimilarity score) may be used in place of and/or in addition to the similarity plot.

In some implementations, the subsurface configuration may be defined by values of multiple subsurface properties as a function of position within the three-dimensional subsurface region, and separate sets of similarity scores may be determined for separate subsurface properties. For instance, the subsurface configuration of a subsurface region may be defined by values of multiple subsurface properties, such as sand thickness, sand quality, sand volume, and/or other sand characteristics, at different spatial positions within the subsurface region. Separate sets of similarity scores may be determined for sand thickness, sand quality, sand volume, and/or other sand characteristics. Separate similarity plots may be generated for separate subsurface properties. For instance, separate similarity plots may be generated for sand thickness, sand quality, sand volume, and/or other sand characteristics. Thus, comparison of different subsurface properties within adjacent map images may result in generation of separate similarity plots for different subsurface properties.

In some implementations, two or more of the separate similarity plots may be combined for the identification of the boundar(ies) within the three-dimensional subsurface representation. For example, multiple similarity plots may be stacked into a single combined similarity plot. Boundar(ies)

within the three-dimensional subsurface representation may be identified using similarity plots for individual subsurface properties, combined similarity plots for multiple subsurface properties, and/or other information. In some implementations, combination of certain patterns within multiple similarity plot may indicate boundar(ies) within the three-dimensional subsurface representation. In some implementations, one or more of the similarity plots (for individual subsurface properties and/or combined subsurface properties) may be weighed the same as or differently from other similarity plots. For example, similarity plots for sand thickness and/or sand volume may be weighed more than similarity plots for other sand characteristics. The weights applied to different similarity plots/subsurface properties may be defined by hand (from experience, intuition), derived from statistical measures (e.g., eigenvalues), and/or otherwise set. In some implementations, multiple weights may be used and/or tested for a similarity plot/subsurface property. For example, a weight for a particular similarity plot/subsurface property may be changed from 10%, to 20%, to 30%. Other use of similarity plots are contemplated.

Figure 7:
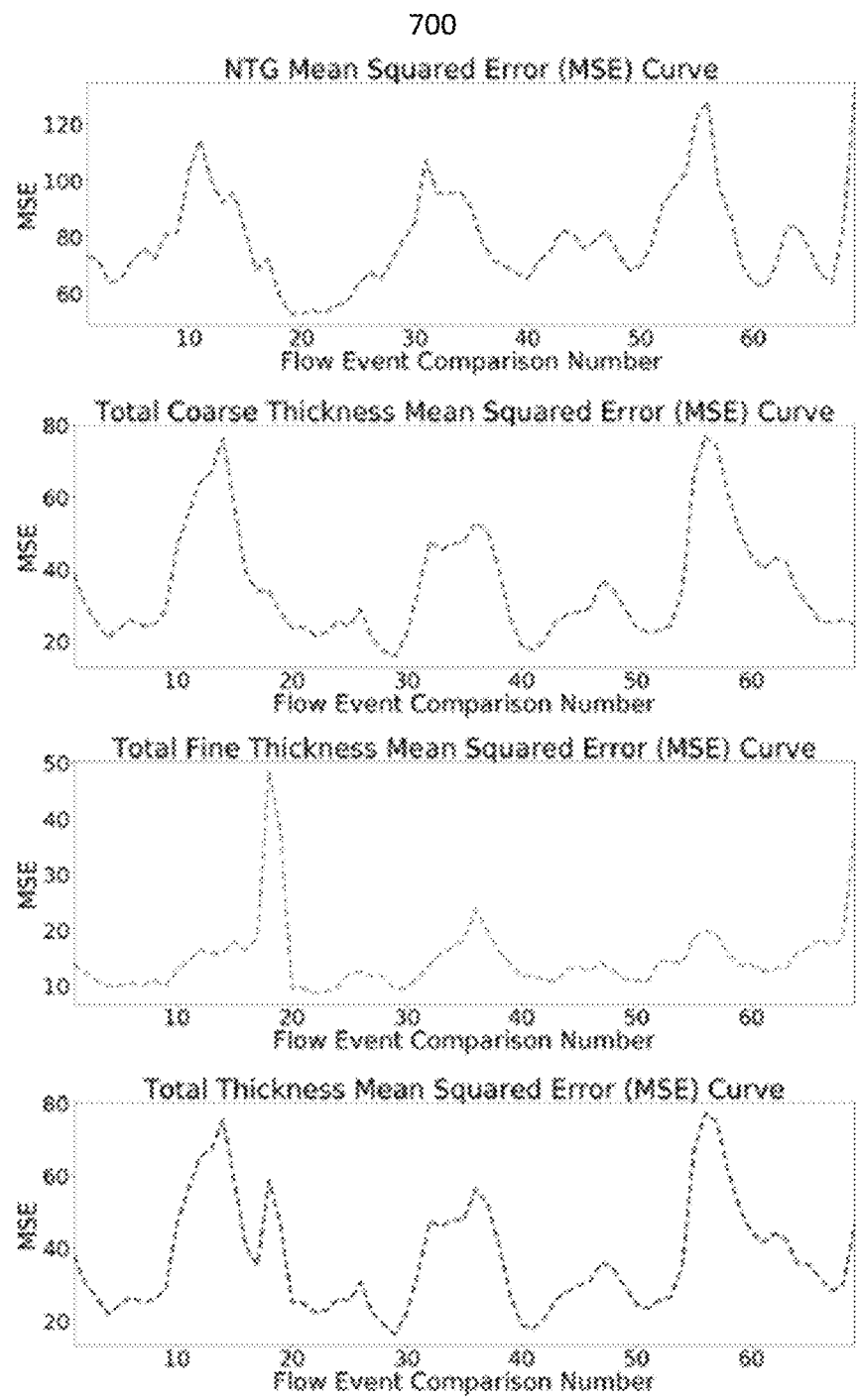
FIG. 7 illustrates example similarity plots.

FIG. 7 illustrates example similarity plots 700. The similarity plots 700 may reflect difference between adjacent/sequential map images of multiple subsurface properties. For example, the values of the similarity plots 700 may reflect mean squared error (MSE) difference between adjacent/sequential map images of the amount/fraction of potentially hydrocarbon-bearing rock (NTG), total coarse thickness, total fine thickness, and total thickness. Larger values of MSE may indicate greater difference between the adjacent/sequential map images.

Figure 8:
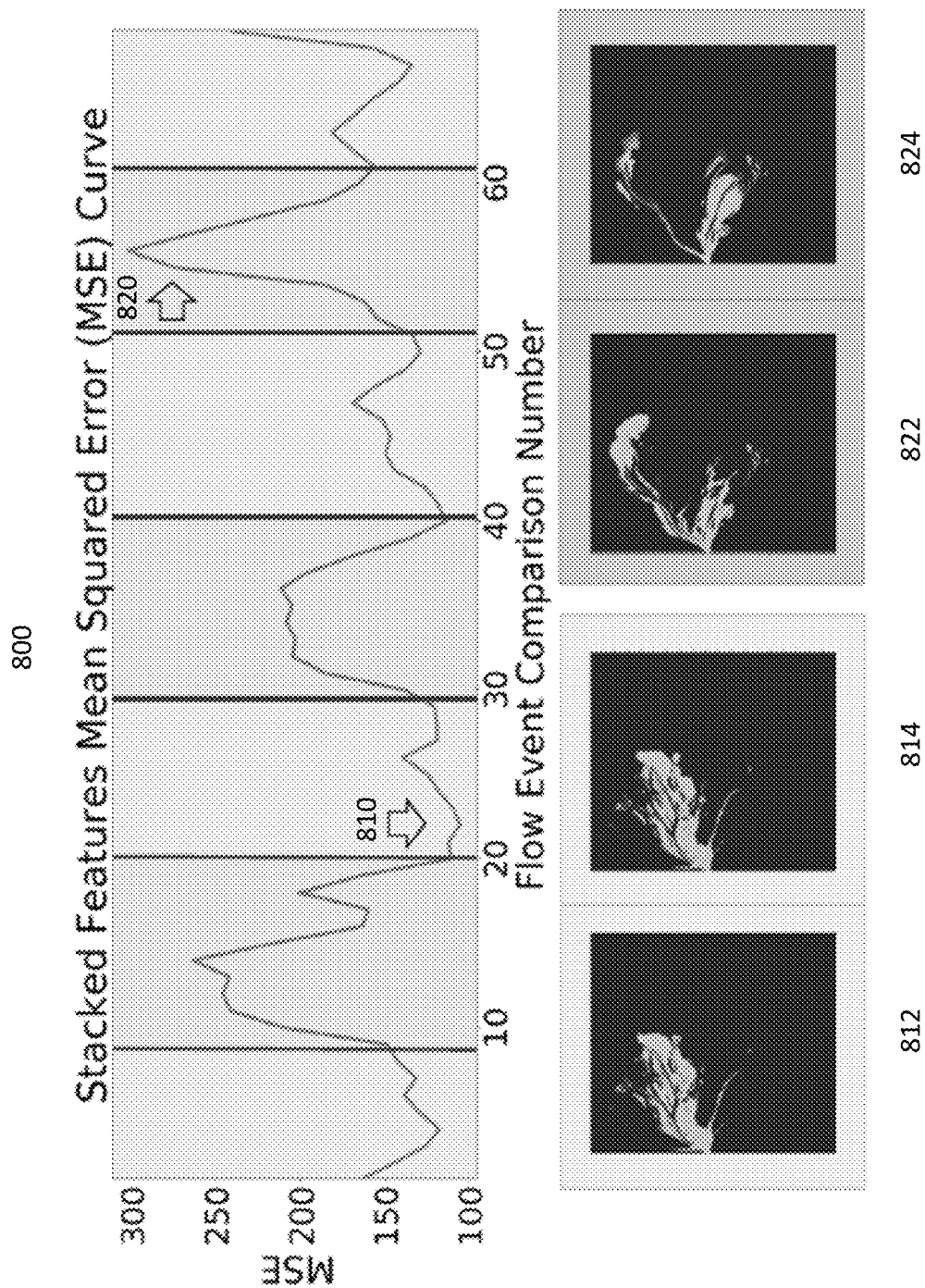
FIG. 8 illustrates example similarity plot and map images.

FIG. 8 illustrates example similarity plot 800 and map images 812, 814, 822, 824. The similarity plot may include a stacked features MSE curve. The stacked features MSE curve may include combination of the four similarity plots 700 shown in FIG. 7. The map images 812, 814 may correspond to a pair of adjacent/sequential images used to generate the value of the similarity plot 800 at location 810. The map images 822, 824 may correspond to a pair of adjacent/sequential images used to generate the value of the similarity plot 800 at location 820. The subsurface configuration may change less between the map images 812, 814 than between the map images 822, 824. The smaller value of the similarity plot 800 at location 810 may reflect the smaller change in subsurface configuration between the map images 812, 814. The larger value of the similarity plot 800 at location 820 may reflect the larger change in subsurface configuration between the map images 812, 814

Figure 9:
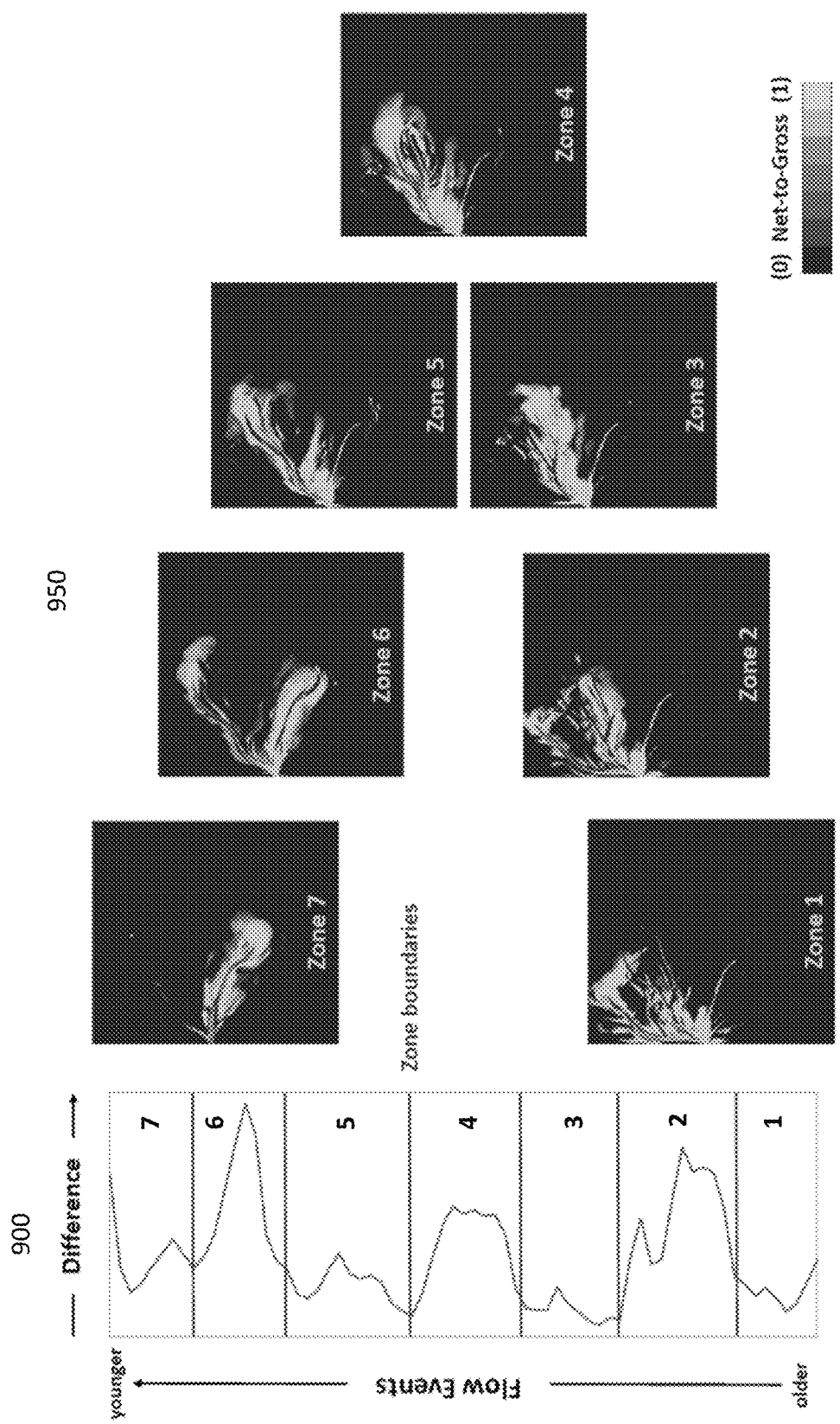
FIG. 9 illustrates example similarity plot and map images.

FIG. 9 illustrates example similarity plot 900 and map images 950. The values of the similarity plot 900 may indicate amount of differences between adjacent/sequential ones of the map images 950. The similarity plot 900 may show differences in subsurface properties of adjacent/sequential map images as a time series. Flow events for the similarity plot 900 may be divided into seven zones, and the map images 950 may include one image from individual zones. In FIG. 9, one-dimensional column of map image difference may be used to threshold packages of data that are similar to each other and/or distinct from other. Additional map images of the collective data in each package may be made to identify the large scale difference of a subsurface property in one zone to that same property in a different zone. For example, the collective maps may be made based on an average of the property values for all maps within the package and/or other information.

The identification of the boundaries within the three-dimensional subsurface representation may include identification of key stratigraphic heterogeneity boundaries and/or locations. The identification of the boundaries within the three-dimensional subsurface representation may enable identification of where subsurface properties have temporally and/or spatially changed, identification of hierarchical components, and/or derivation of new insights on the spatial and/or temporal scales of changing subsurface properties. Segmentation of a subsurface representation through boundary identification may be applied to not just three-dimensional subsurface representation (e.g., representation generated using a three-dimensional numerical model), but also to extracted data, such as pseudo-well logs. Pseudo-well logs may be used to connect numerical models to petrophysical properties, and may be used to identify real well-log (e.g., 1D column data) patterns that precede or follow signal spatial/temporal shifts in heterogeneity. The identification of the boundaries within the three-dimensional subsurface representation may enable improved data-constrained assessments of reservoir environment of deposition, reservoir heterogeneity, and reservoir connectivity, which may inform performance predictions and influence well placement. The identification of the boundaries within the three-dimensional subsurface representation may enable the application of learnings/results to same and/or similar EOD. For example, if this analysis is run on multiple instances of numerical models of the same EOD and common patterns are identified, then information about and/or extracted from the common patterns may be applied to a subsurface region (e.g., field) that has the same EOD.

In some implementations, the identified boundar(ies) may be used to segment the three-dimensional subsurface representation and/or extract subsurface data from the three-dimensional subsurface representation. For example, an identified boundary may be used as a spatial/temporal boundary to segment the three-dimensional subsurface representation into different spatial/temporal parts. For instance, an identified boundary may be used as a spatial/temporal boundary that separate parts of the three-dimensional subsurface representation with significant differences in one or more subsurface properties/combination of subsurface properties. As another example, an identified boundary may be used to group subsurface data from the three-dimensional subsurface representation by spatial/temporal parts. For instance, two identified boundaries that define a spatial/temporal slice of the three-dimensional subsurface representation may be used to extract subsurface data from the spatial/temporal slice to be analyzed.

In some implementations, the identified boundar(ies) may be applied to derivative data, such as subsurface data of pseudo wells from the numerical model. Pseudo wells may be extracted from a three-dimensional subsurface representation, and the zones/patterns in those wells may be identified based on the identified boundar(ies). A pseudo well may refer to a location where a well has not been drilled, but where synthetic logs may be generated. For example, a pseudo well may be generated based on logs of wells drilled in nearby locations and/or similar locations. A pseudo well may be extracted from a computer-modeled three-dimensional subsurface representation of a subsurface region.

The identified boundar(ies) may be used to determine which surfaces/patterns are important in identifying packages (e.g., packages representative of important shift(s) in space). For example, if repeated patterns of heterogeneity boundaries exist for certain depositional environments, machine learning may be applied to group surfaces that correspond to heterogeneity boundaries and connect these (correlate them) to pseudo wells, discover important patterns in well logs, find important depositional surfaces, and then find which well log patterns are related to important heterogeneity boundaries. Boundaries (surfaces) applied on pseudo wells may provide information on whether there are patterns above and/or below a boundary (surface) that represent its importance and/or its nature, and such data may be used as a training tool for algorithms to identify/analyze patterns in subsurface data.

For instance, heterogeneity boundaries in multiple subsurface representations may be evaluated, and the patterns may be analyzed to determine whether there is a common pattern in heterogeneity boundaries. If so, pseudo wells may be extracted from the subsurface representations to apply the heterogeneity boundaries onto those wells and show how these heterogeneity boundaries are represented in pseudo well log data. Machine learning may be used to determine if, across these/any groups of wells, common well log patterns above and below those heterogeneity boundaries exist. If so, those well log patterns may be used to identify where heterogeneity boundaries may exist in real subsurface regions.

In some implementations, the identification of the boundar(ies) within the three-dimensional subsurface representation may be used to segment other three-dimensional subsurface regions. Boundaries identified within a three-dimensional subsurface representation of a subsurface region may be used to segment a three-dimensional subsurface representation of another/different three-dimensional subsurface region. For example, identified boundaries within a three-dimensional subsurface representation of a subsurface region may be used to identify patterns that indicate boundaries, and these patterns may be identified within a three-dimensional subsurface representation of another/different subsurface region to segment the other subsurface region. For instance, boundar(ies) may be identified within a three-dimensional subsurface representation from a numerical model (e.g., a CompStrat model), and the patterns learned from the boundar(ies) may be identified within real/synthetic well logs and used to help correlate/group segments of the subsurface region corresponding to the real/synthetic well logs.

In some implementations, the identification of the boundar(ies) within the three-dimensional subsurface representation may be used to determine correlation between well segments. A well segment may refer to a segment of a well. Determining a correlation between well segments of different wells may include determining a connection/link between well segments of different wells. For example, the identified boundaries may be used to correlate comparable wells. The use of identified boundaries to correlate wells may enable determination of correlation between seemingly different packages and/or non-correlation between similar packages. For example, the identified boundaries may be used to determine that similar packages in different wells are not actually connected.

Figure 10:
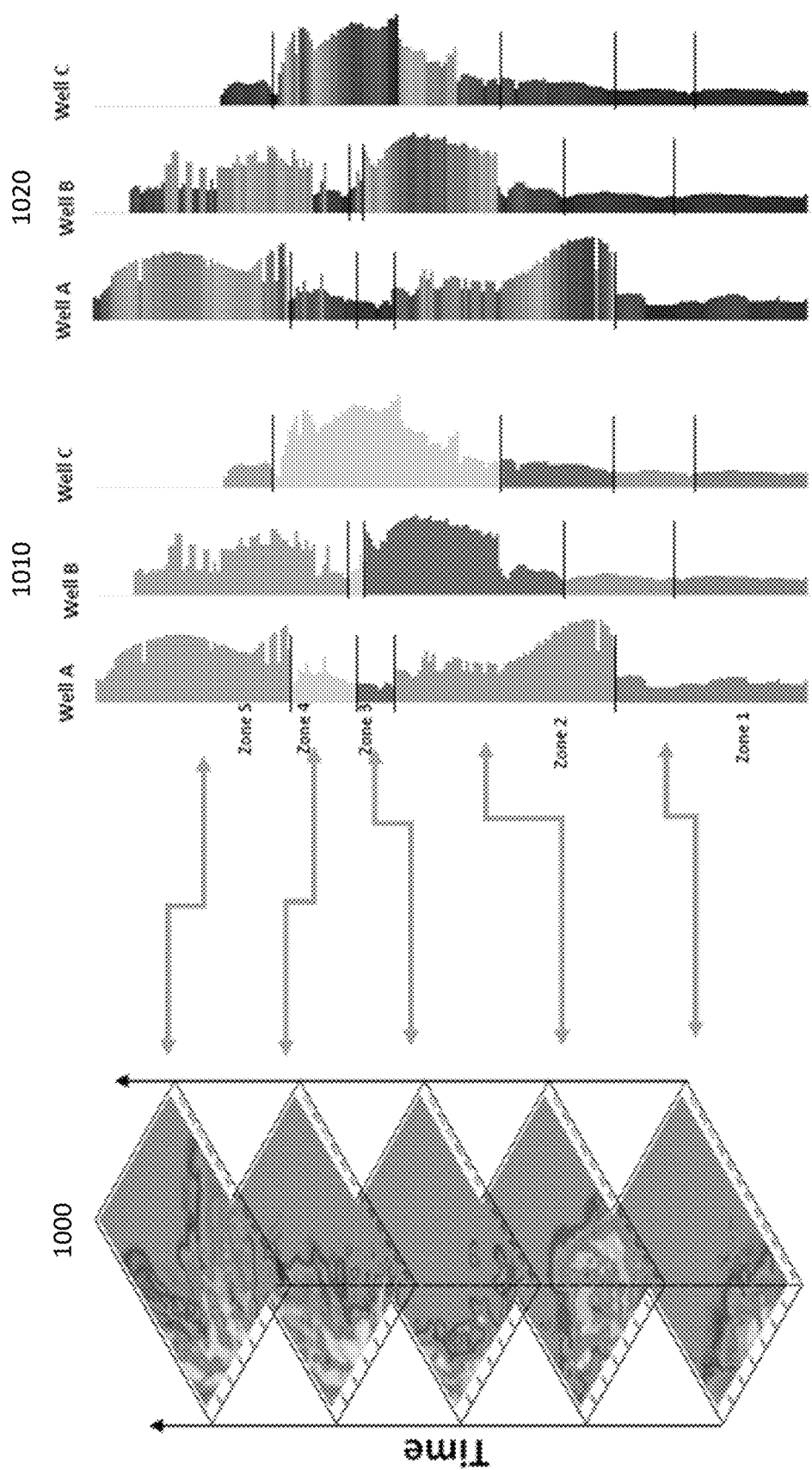
FIG. 10 illustrates example correspondence between layers of different wells.

FIG. 10 illustrates example correspondence between layers of different wells. A three-dimensional subsurface representation may be divided into five zones 1000 based on identified boundaries. Three wells may be located within the three-dimensional subsurface representation, and the division of the three-dimensional subsurface representation using the identified boundaries may result in simultaneous segmentation of all wells (into five zones). A grain-size zone plot 1010 may show groupings of grain sizes in different zones of three wells. A grain-size plot 1020 may show different qualities of grain through individual zones in three wells. As shown in the grain-size plot 1020, different subsurface properties may exist within well segments of same zone. The grain-size plot 1020 may facilitate understanding of spatial/temporal changes in subsurface properties of wells, which may be used to determine locations to drill wells (e.g., predicting best locations to drill wells).

Figure 11:
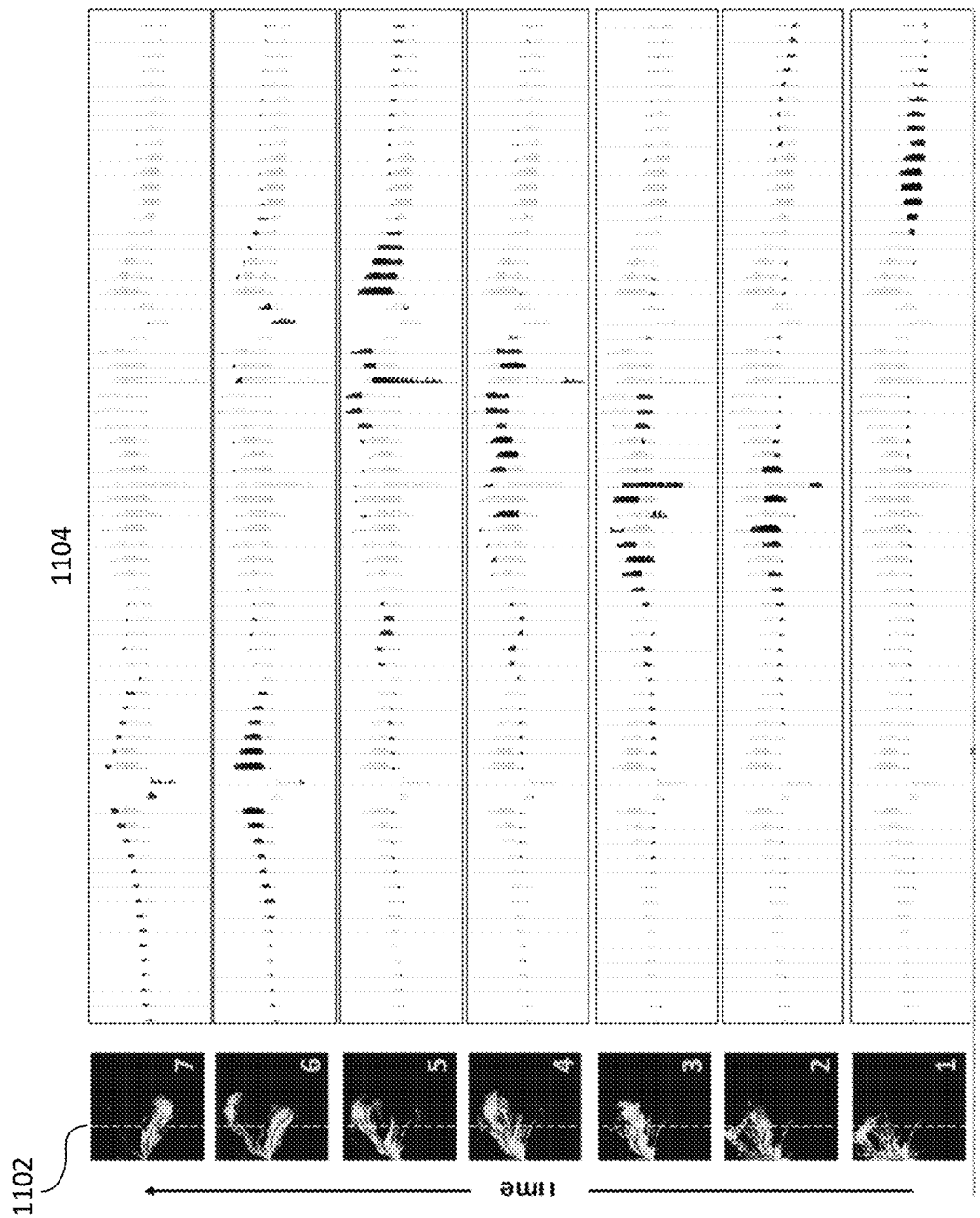
FIG. 11 illustrates example vertical extractions of different zones.

FIG. 11 illustrates example vertical extractions of different zones. FIG. 11 may illustrate seven zones of a subsurface region. Boundaries identified within a three-dimensional subsurface representation may be used to segment the corresponding subsurface region into different zones. Subsurface properties of individual zones may be plotted as seven map images. A line 1102 may represent spatial location of vertical extractions 1104. With the boundaries in three dimensions and on all wells simultaneously identified, if wells are extracted along a line (e.g., the line 1102), such zones may be applied to the wells. The variance in well patterns within the zones across multiple wells may be identified. This variance in well patterns may be critical in understanding how a heterogeneity boundary is represented differently (i.e., by different well patterns) in different wells across a field, such as how knowledge regarding a well may be applicable to areas around the well, how informative/representative a well from a real subsurface asset may or may not be of the areas around the well, and/or how far away from the well this information may be still applicable/representative.

Figure 12:
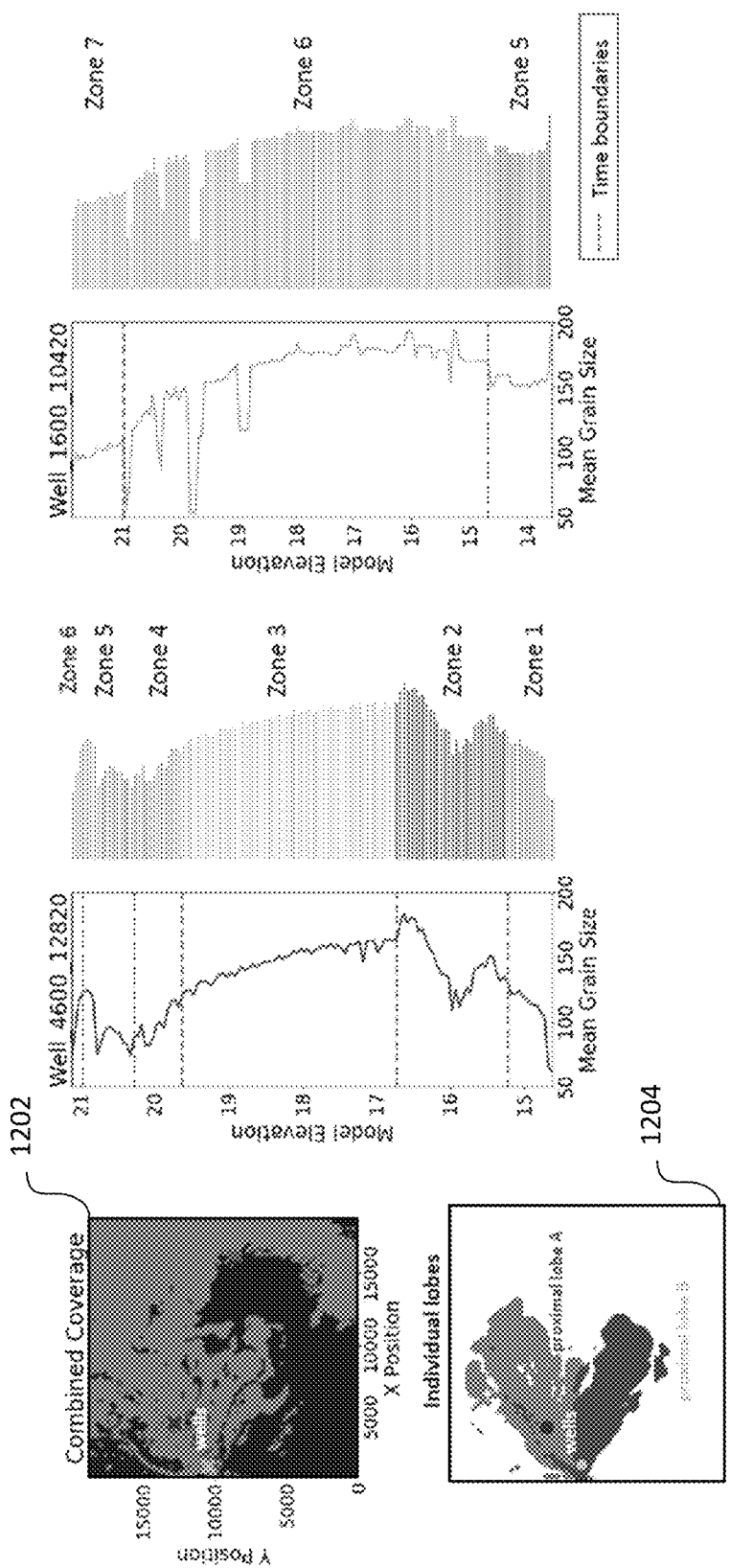
FIG. 12 illustrates example segmentation of well data.

FIG. 12 illustrates example segmentation of well data. Well data may be segmented in time and/or space into different zones based on the identification of boundaries and/or analysis of subsurface properties using the identified boundaries. While segments of different wells may appear to be connected (e.g., based on similar subsurface properties/patterns), segmentation of the well using boundary identification may show that the well segments are not connected or that the connection of well segments is not a rail-way type connection (e.g., simple layer-cake, one-to-one connection). For example, a subsurface configuration of a well within a subsurface region may be compared with subsurface configurations of wells at different locations within the subsurface region. Subsurface configurations of wells at different locations within the subsurface region may have similar patterns, which may suggest that regions between the wells may be connected (e.g., similar patterns of sand packages identified in wells at different locations may suggest that the sand packages are connected/continuous between the two wells). However, segmentation of well data in time based on the identification of heterogeneity boundaries may show that the subsurface configurations between wells at different locations in the subsurface region are disconnected in time, and that the regions and subsurface features between the wells are not connected to one another. That is, although the wells may contain similar patterns of subsurface configurations and/or similar subsurface features, these patterns are not necessarily continuous between the wells, and therefore the subsurface feature/configuration present within the wells may not be connected. Such information may have significant implications for well planning and performance forecasting.

For example, in FIG. 12, a map 1202 may show similar patterns between wells at different locations based on pixel intensity. Lighter colored areas of the map 1202 may indicate well locations with similar patterns and/or properties as a well located at x position 1600 and y position 10420. Lighter colored area of the map 1202 may include a well located at x position 4600 and y-position 12820. Similar patterns and/or properties indicated by lighter colored areas of the map 1202 may make it appear that the patterns and/or properties corresponding to lighter colors may be connected (continuous) between these two wells, and/or that these two wells or the subsurface feature they penetrate/sample may be connected. A map 1204 may show two lobes (proximal lobe A, proximal lobe B) in the subregion. From the map 1204, it can be seen that the wells are located in different lobes (i.e., same type but different individual subsurface features).

For example, in FIG. 12, zones for the well may have been determined based on identified heterogeneity boundaries. When the two wells are compared using the applied zones, it can be seen that while the wells have similar patterns, the similar patterns are not from the same time (i.e., were not deposited at the same time). That is, the wells are disconnected in time and space. Thus, the workflow disclosed herein enables determination that wells having the same/similar patterns and separated by relatively short distances may be completely disconnected, which may mean that the corresponding reservoirs in corresponding asset are completed disconnected.

In some implementations, determining connections (correlation) between segments of wells may take into account spatial relationships between the wells. Spatial relationships between wells may include distance between wells and/or relative direction of one well to another well. For example, identification of boundaries within multiple subsurface representations may enable a user to conclude that similar subsurface properties/patterns of well segments that are a certain distance apart and/or arranged in a certain relative location (e.g., direction of one well to another well) in a depositional environment are likely to be connected, whereas such similar subsurface properties/patterns of well segments that are apart at different distance(s) and/or differently arranged in the depositional environment are likely to be not connected. Thus, identification of the boundar(ies) within the three-dimensional subsurface representation may enable correlation of well segments based on subsurface property/pattern similarity and spatial relationship between the wells, which has direct impact on determining where and/or in what configuration to drill wells (e.g., best locations to drill wells).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
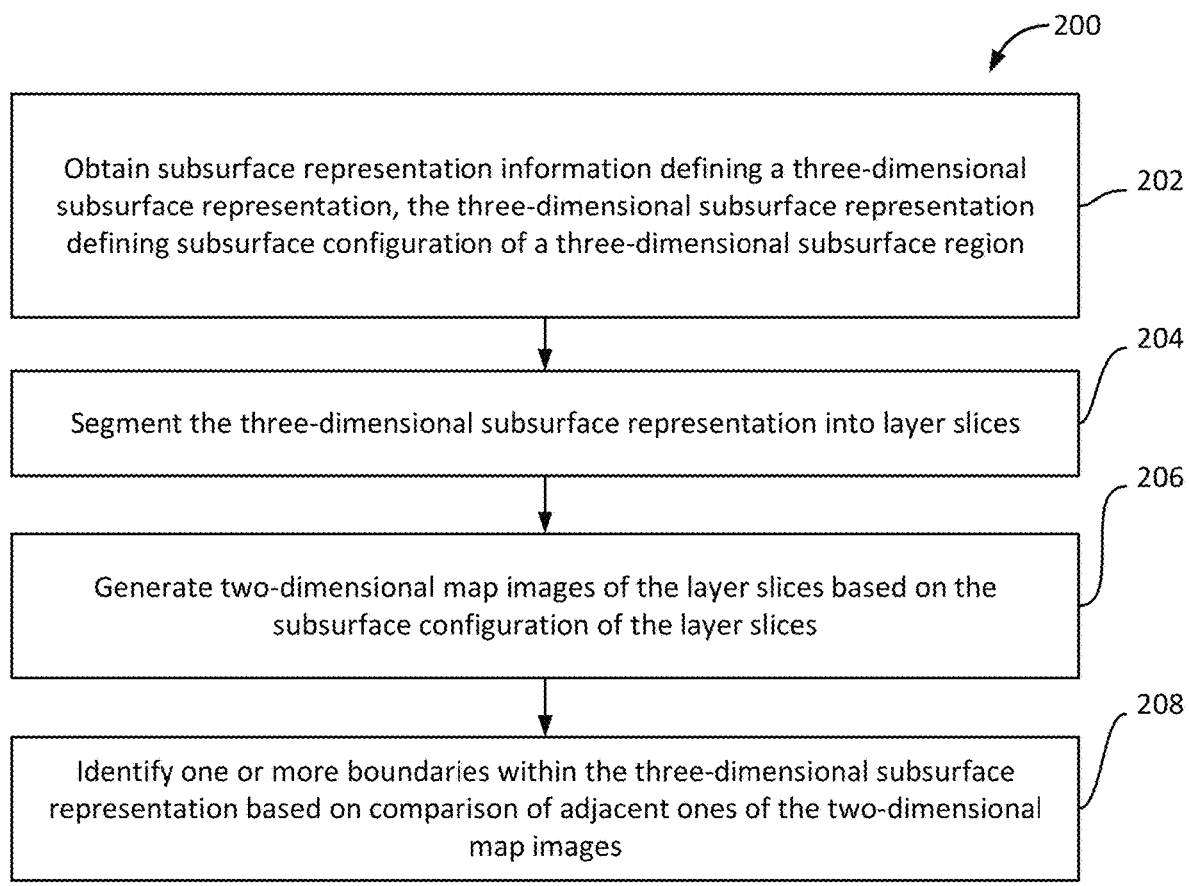
FIG. 2 illustrates an example method for analyzing subsurface representations.

FIG. 2 illustrates method 200 for analyzing subsurface representations. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, subsurface representation information and/or other information may be obtained. The subsurface representation information may define a three-dimensional subsurface representation. The three-dimensional subsurface representation may define subsurface configuration of a three-dimensional subsurface region. In some implementation, operation 202 may be performed by a processor component the same as or similar to the subsurface representation component 102 (Shown in FIG. 1 and described herein).

At operation 204, the three-dimensional subsurface representation may be segmented into layer slices. In some implementation, operation 204 may be performed by a processor component the same as or similar to the segment component 104 (Shown in FIG. 1 and described herein).

At operation 206, two-dimensional map images of the layer slices may be generated based on the subsurface configuration of the layer slices and/or other information. In some implementation, operation 206 may be performed by a processor component the same as or similar to the map component 106 (Shown in FIG. 1 and described herein).

At operation 208, one or more boundaries within the three-dimensional subsurface representation may be identified based on comparison of adjacent ones of the two-dimensional map images and/or other information. In some implementation, operation 208 may be performed by a processor component the same as or similar to the boundary component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for analyzing subsurface representations, the system comprising:
one or more physical processors configured by machine-readable instructions to:
obtain subsurface representation information defining a three-dimensional subsurface representation, the three-dimensional subsurface representation defining subsurface configuration of a three-dimensional subsurface region;
segment the three-dimensional subsurface representation into layer slices;
generate two-dimensional map images of the layer slices based on the subsurface configuration of the layer slices; and
identify one or more boundaries within the three-dimensional subsurface representation based on comparison of adjacent ones of the two-dimensional map images, wherein identification of the one or more boundaries within the three-dimensional subsurface representation based on the comparison of the adjacent ones of the two-dimensional map images includes:
determination of similarity scores between adjacent layer slices based on the comparison of the adjacent ones of the two-dimensional map images;
generation of a similarity plot based on the similarity scores; and
identification of the one or more boundaries within the three-dimensional subsurface representation based on the similarity plot;
wherein the subsurface configuration is defined by values of multiple subsurface properties as a function of position within the three-dimensional subsurface region, separate sets of two-dimensional map images are generated for separate subsurface properties, separate sets of similarity scores are determined for separate subsurface properties, and separate similarity plots are generated for separate subsurface properties.

2. The system of claim 1, wherein the three-dimensional subsurface representation is defined as a three-dimensional array of cells, cell values defining corresponding subsurface configuration, and the layer slices include groupings of the three-dimensional array of cells.

3. The system of claim 1, wherein the three-dimensional subsurface representation is segmented into the layer slices based on depositional processes used to generate the three-dimensional subsurface representation.

4. The system of claim 1, wherein the comparison of the adjacent ones of the two-dimensional map images includes comparison of adjacent images within individual sets of two-dimensional map images.

5. The system of claim 1, wherein two or more of the separate similarity plots are combined for the identification of the one or more boundaries within the three-dimensional subsurface representation.

6. The system of claim 1, wherein addition or removal of a feature in the subsurface configuration of the three-dimensional subsurface region is determined based on the comparison of the adjacent ones of the two-dimensional map images.

7. The system of claim 1, wherein the identification of the one or more boundaries within the three-dimensional subsurface representation is used to segment other three-dimensional subsurface regions.

8. The system of claim 1, wherein the identification of the one or more boundaries within the three-dimensional subsurface representation is used to determine correlation between well segments.

9. A method for analyzing subsurface representations, the method comprising:
- obtaining subsurface representation information defining a three-dimensional subsurface representation, the three-dimensional subsurface representation defining subsurface configuration of a three-dimensional subsurface region;
- segmenting the three-dimensional subsurface representation into layer slices;
- generating two-dimensional map images of the layer slices based on the subsurface configuration of the layer slices; and
- identifying one or more boundaries within the three-dimensional subsurface representation based on comparison of adjacent ones of the two-dimensional map images, wherein identifying the one or more boundaries within the three-dimensional subsurface representation based on the comparison of the adjacent ones of the two-dimensional map images includes:
  - determining similarity scores between adjacent layer slices based on the comparison of the adjacent ones of the two-dimensional map images;
  - generating a similarity plot based on the similarity scores; and
  - identifying the one or more boundaries within the three-dimensional subsurface representation based on the similarity plot;
- wherein the subsurface configuration is defined by values of multiple subsurface properties as a function of position within the three-dimensional subsurface region, separate sets of two-dimensional map images are generated for separate subsurface properties, separate sets of similarity scores are determined for separate subsurface properties, and separate similarity plots are generated for separate subsurface properties.

10. The method of claim 9, wherein the three-dimensional subsurface representation is defined as a three-dimensional array of cells, cell values defining corresponding subsurface configuration, and the layer slices include groupings of the three-dimensional array of cells.

11. The method of claim 9, wherein the three-dimensional subsurface representation is segmented into the layer slices based on depositional processes used to generate the three-dimensional subsurface representation.

12. The method of claim 9, wherein the comparison of the adjacent ones of the two-dimensional map images includes comparison of adjacent images within individual sets of two-dimensional map images.

13. The method of claim 9, wherein two or more of the separate similarity plots are combined for the identification of the one or more boundaries within the three-dimensional subsurface representation.

14. The method of claim 9, wherein addition or removal of a feature in the subsurface configuration of the three-dimensional subsurface region is determined based on the comparison of the adjacent ones of the two-dimensional map images.

15. The method of claim 9, wherein the identification of the one or more boundaries within the three-dimensional subsurface representation is used to segment other three-dimensional subsurface regions.

16. The method of claim 9, wherein the identification of the one or more boundaries within the three-dimensional subsurface representation is used to determine correlation between well segments.

* * * * *